(12) United States Patent
Dietz et al.

(10) Patent No.: US 10,410,480 B2
(45) Date of Patent: Sep. 10, 2019

(54) CARD READING ASSEMBLY AND SELF-SERVICE TERMINAL EQUIPPED WITH THE SAME AS WELL AS METHOD FOR MONITORING THE SAME

(71) Applicant: Wincor Nixdorf International GmbH, Paderborn (DE)

(72) Inventors: Oliver Dietz, Borchen (DE); Matthias Schmidt, Paderborn (DE)

(73) Assignee: Wincor Nixdorf International GmbH, Paderborn (DE)

( * ) Notice: Subject to any disclaimer, the term of this patent is extended or adjusted under 35 U.S.C. 154(b) by 0 days.

(21) Appl. No.: 15/758,723

(22) PCT Filed: Sep. 8, 2016

(86) PCT No.: PCT/EP2016/071190
§ 371 (c)(1),
(2) Date: Mar. 8, 2018

(87) PCT Pub. No.: WO2017/042279
PCT Pub. Date: Mar. 16, 2017

(65) Prior Publication Data
US 2018/0247495 A1    Aug. 30, 2018

(30) Foreign Application Priority Data
Sep. 9, 2015 (DE) .................. 10 2015 115 172

(51) Int. Cl.
*G06K 19/00* (2006.01)
*G07F 19/00* (2006.01)
(Continued)

(52) U.S. Cl.
CPC ......... *G07F 19/209* (2013.01); *G06K 7/0069* (2013.01); *G06K 7/10653* (2013.01); *G07F 19/205* (2013.01); *G07F 19/2055* (2013.01)

(58) Field of Classification Search
USPC ........ 235/375, 380, 435, 439, 451, 487, 492
See application file for complete search history.

(56) References Cited

U.S. PATENT DOCUMENTS 8,640,947 B1 *   2/2014   Lewis ................. G07F 19/209
                                                         235/379

OTHER PUBLICATIONS

International Preliminary Report on Patentability for the corresponding PCT application; 14 pages.
(Continued)

*Primary Examiner* — Matthew Mikels
(74) *Attorney, Agent, or Firm* — Black, McCuskey, Souers & Arbaugh, LPA

(57) ABSTRACT

A card reading assembly for a self-service terminal includes a storing compartment for a card containing data to be read. The self-service terminal includes at least one sensor and an evaluation device connected hereto and the card reading assembly is protected against manipulation attempts by arranging at least one sensor in the card reading assembly and at least one linearly extending sensor arrangement that is attached in the storing compartment. The evaluation device checks at least one spatial dimension of the card via the sensor arrangement. Preferably, the sensor system is a sensor arrangement including a plurality of linearly extending sensor elements that extend in a first direction or a second direction in relation to the card retracted into the storing compartment. It can be effectively determined whether a retracted card is a genuine card of if a manipulation is present that targets the inside of the card reading assembly.

11 Claims, 12 Drawing Sheets

(51) Int. Cl.
*G06K 7/00* (2006.01)
*G06K 7/10* (2006.01)

(56) References Cited

OTHER PUBLICATIONS

Init: "Jahresbericht 2014 Institut fur industrielle informatiionstechnik", May 7, 2015 (May 7, 2015), XP055321391, Gefunden im Internet: URL:https://www.hs-owl.de/init/aktuelles/news/news-detail/news/aktueller-ahresbericht-2014jetzt-online.html [gefunden am Nov. 21, 2016].
Anonymous: "inIT: Mit neuen Technologien Geldautomaten var Dieben schutzen", Nov. 26, 2013 (Nov. 26, 2013), XP055319804, Gefunden im Internet:URL:https://www.hs-owl.de/init/en/aktuelles/veranstaltungen/veranstaltungen-einzelansicht/news/mit-neuen-technologien-geldauto maten-vor-dieben-sch uetzen.html [gefunden am Nov. 15, 2016].

* cited by examiner

CARD READING ASSEMBLY AND SELF-SERVICE TERMINAL EQUIPPED WITH THE SAME AS WELL AS METHOD FOR MONITORING THE SAME

CROSS-REFERENCE TO RELATED APPLICATIONS

This application is a National Phase Patent Application of International Patent Application Number PCT/EP2016/071190, filed on Sep. 8, 2016, which claims priority of German Patent Application Number 10 2015 115 172.3, filed on Sep. 9, 2015.

The present invention relates to a card reading assembly for a self-service terminal and in particular for an ATM (Automated teller machine) according to the subject-matter of claim 1. Furthermore, the invention relates to a self-service terminal equipped with the same and a method for monitoring according the self-service terminal to the subject-matter of the independent method claims.

BACKGROUND OF THE INVENTION

Very often, the card reading assemblies in self-service terminals are a primary target for manipulation-attempts and skimming-attacks. This is because a user, attempting to use the self-service terminal that in particular can be an ATM, requires a banking-card that usually comprises a chip and/or a magnet strip on which card data including the personal customer and account access data are stored. Unfortunately, many self-service terminals are manipulated by third persons in order to obtain these data in a criminal manner. Amongst other techniques a spy-device is tried to be inserted into the card-slot of the card reading assembly in an inconspicuous manner, wherein this spy-device is capable to directly read out the magnetic strip or to attach to an internal interface (such as an USB-interface) of the card reading-device. By this method the bank-data of the card can be read in order to produce an illegal copy of the card. Moreover, skimming-attempts are known in which an alien card reader device is attached to the card reading assembly as an unobtrusive superstructure, capable to e.g. send the read out card data via a radio transmission. If the fraudster is also capable to obtain the security number (PIN) of the card he/she can easily withdraw money from accompanying account. Moreover, skimming-attacks are known in which an internal interface directly stimulates a card reading process and manipulates the software control of the self-service terminal (or ATM).

Moreover, direct trapping of a card (Card Trapping) is another known attack scenario. Within this trapping scenario a superstructure is attached to the card reading assembly to steal the card. This superstructure which is directly mounted behind the card slot comprises a loop for one-directionally inserting card. Once a customer inserts a card, said card is captured by the loop which prevents the card from being ejected again. By this behaviour the user believes his card to be (rightfully) withheld and he consequently leaves the self-service terminal. In the following the deceiver takes the card together with the superstructure.

In order to detect card trapping, the process of card-retract has been modified in the prior art. The card is first retracted, then driven out and then retracted again by the card reading assembly. If this method is not possible in a perfect manner, i.e. ejecting a card is not possible, it can be assumed that a card theft has been attempted. However, this security method/approach increases the transaction time at the device.

It is also known to counteract such manipulation attempts of self-service terminals be using sensors. The German patent application DE 196 05 102 A1 discloses to use one or more infrared sensors for safeguard the self-service terminal, wherein the signals of these sensors are processed by an evaluation device to detect superstructures.

In the German patent application DE 10 2008 012 231 A1 a protection device is proposed that comprises a protection-shield-generator and a connected induction coil to create an electromagnetic protection shield that covers the electromagnetic fields which are created during (illegally) reading-out the card and therefore influence/interfere the functionality of the alien card reading assembly such that it fails to deliver useful data. To avoid that the deceiver may detect this protection device, the electromagnetic protection-field is generated with a special protection signal simulating a standard card-reading signal that only contains unuseful pseudo-data. However, this protection device can not be used to avoid or impede such skimming-attempts that are directly targeted to the interior of the card reading assembly and e.g. receive signals from an inserted spy-device or even from an interior data interface.

In this context there is also to mention the German patent application DE 10 2009 019 708 A1 which discloses to create a stray-field via permanent magnets that are moved by piezo-elements, in order to generate an induced magnetic alternating field which effectively interferes the skimming card reading assembly while reading-out the data. Furthermore the European patent application EP 1 394 728 A1 is cited in which supersonic sensors are disclosed to detect an attached superstructure to the self-service terminal. But also these solutions are not capable to avoid or impede skimming-attempts that occur in the interior of the card reading assembly.

In the US patent application US 2006/0249574 A1 the misuse of a card is mentioned, but not a manipulation within the interior of the card reading assembly as such. Herein, it is proposed to equip the card with a microcontroller and an encryption function (cf. FIG. 2). For the power supply of the microcontroller there are photovoltaic or piezo-electric components proposed. However, monitoring of or defense against skimming-attempts via sensors is not described.

Furthermore, it is well known to protect devices that are commonly used to store money or valuables, in particular vaults or bank-vaults with sensors. For instance the German patent application DE 2 318 478 A1 discloses a monitoring system for a strongroom, in which supersonic-sensors are used to determine motions therein via the Doppler-effect. Another disclosure that is relying on an ultrasonic alarm mechanism is disclosed in the German patent application DE 2 617 467 A1.

Accordingly, conventional self-service terminals comprise a card reading chamber into which a card can be inserted that contains data to be read, wherein the self-service terminal comprises at least one sensor for defence against manipulation attempts and an evaluation device. However, these solutions are not capable for protection against manipulations attempts that aim on the interior of the card reading assembly.

Accordingly, the conventional self-service terminals are equipped with a card reading assembly, which has an accommodation chamber for a card on which data to be read is stored, whereby the self-service terminal itself can be equipped with at least one sensor system and an evaluation device connected to it in order to prevent manipulation attempts. However, these solutions are not suitable for effectively preventing manipulation attempts aimed at the interior of the card reader device.

The terms natural frequency and mode are defined below.

Particularly well suitable frequencies for a chamber or a device/body that encloses a chamber are called natural frequency. If a natural frequency assumed to be a flat wave spreads in a chamber or body in all directions of coordinates, the reflections on the walls create a large number of waves, which overlap at each chamber point/body point according to their phase position. This results in ranges with predominantly constructive interferences and those with predominantly destructive interferences. The resulting pattern is called eigenmode.

It is therefore the objective of the present invention to further develop a card reading assembly of the kind mentioned above, so that attempts at manipulation and skimming attacks aimed at the interior and exterior of the card reading assembly are safely repelled or at least effectively hindered.

In particular, the housing for mounting the card reader device should receive a higher level of security through appropriate data processing and analysis. Any attack on the card reader device should be detected. The system should be highly available and robust, as false alarms often lead to a lack of attention or to the safety device being switched off.

An authorization concept for technician/engineer operations at the safety devices is required. The authorization can be done, for example, analogous to the authorization of the device user, i.e. with card and PIN or by using the Crypta-Stick or authorizations via the SOP (software operator panel).

A self-service terminal equipped with such a card reading assembly and a method of monitoring such a self-service terminal will also be presented.

SUMMARY OF THE INVENTION

The preceding object is achieved by a card reading assembly comprising the features of the independent claims as well as by a self-service terminal and a method having the features of the according juxtaposed claims.

Accordingly, a card reading assembly is presented for a self-service terminal, with a housing into which a card can be inserted to be read, comprising sensors and/or actuators connected to an evaluation device and equipped with mechatronic transducers. This card reading assembly comprises mechatronic transducers arranged in or on the housing in such a way that the integrity of the card reading assembly, in particular the housing (1), can be verified. The evaluation device is set up to receive a signal from the mechatronic transducers which is excited by a part of the mechatronic transducers and detected by a part of the mechatronic transducers in order to compare it with reference data, and to issue a warning signal in case of a defined deviation, which indicates a lack of integrity of the card reading assembly. The evaluation device is arranged advantageously inside the housing to be tested. The present invention also provides a self-service terminal that in particular can be an ATM, comprising said card reading assembly. Furthermore, a method for monitoring the self-service terminal or the ATM via the sensor system and the evaluation device is presented, wherein the sensor system is arranged inside the card reading assembly and comprises at least one linearly extending sensor arrangement that particularly is arranged in the storing compartment and wherein at least one spatial dimension of the card is verified/checked via the evaluation device.

In a possible embodiment, the evaluation device manages and stores reference data for different states of the card reader device/card reading assembly, in particular whether a card is in the accommodation chamber or whether there is no card in the accommodation chamber. In addition, manipulated states are recorded and classified using reference data, i.e. manipulated states can be qualified for evaluation, e.g. it can be used to detect whether the housing has been damaged or whether a skimming device is attached to the insertion slot, for example, because these structural changes would alter the signal.

Another embodiment is a card reading assembly for a self-service terminal, which has an accommodation chamber for a card, in which the data stored on the card is read. In this case, a corresponding card reading device is located in the accommodation chamber of the card reading assembly device, which reads the data from the magnetic stripe or chip of the card. Attention should be paid to the fact that attackers often insert an element into the accommodation chamber in order to read this data as well. Furthermore, mechatronic transducers, in particular piezo electrical converters, comprising sensors and/or actuators connected to an evaluation device, are provided on the housing or the mechatronic unit card reading assembly. The purpose of these transducers is to stimulate the module by means of an actuator and to detect this excitation sensitively.

The position of the transducers is arranged in such a way that the integrity of the accommodation chamber or recording area or the enveloped volume can be ensured or a change outside of the standard state can be detected. In addition, the integrity of the enclosure should be ensured so that tampering of the enclosure can be detected; these can include: unauthorised attachments and/or openings, etc. For example, the aforementioned attack scenarios such as skimming with an attachment on the housing slot or card theft by card trapping can be addressed here. The attachment changes the mass of the component and thus also the vibration behavior of the device, the eigenmodes or eigenfrequencies of the component are shifted. If a defined signal is now introduced by an actuator-driven converter, the signal image on the sensor-operated converters changes.

Alternatively, it is also possible to check whether there is an unauthorized object in the accommodation chamber that reads the data from the card in an unauthorized manner, because this leads to a different oscillation behavior and a different signal image than would be the case with permissible objects, as with permissible cards. The evaluation device manages reference data from the mechatronic transducers which represent a permissible state of the recording chamber, the evaluation device being adapted to receive a high-frequency signal from the mechatronic transducers, controlled by an event, which is stimulated by a portion of the mechatronic transducers and is detected by a portion of the mechatronic transducers to compare it with the reference data and to output a warning signal in case of a defined deviation. These reference data can be different for different states.

The warning signal can lead to the automatic self-service machine's functions being deactivated or messages being transmitted to a central control unit. It is also possible to activate additive safety and inspection units such as a surveillance camera.

The invention also provides a self-service terminal, in particular an ATM with such a card reading assembly. In addition, a method is presented here with which a monitoring of the self-service terminal or ATM is carried out by means of the sensors and the evaluation device, wherein the sensors are arranged in, on or around the card reading assembly.

Possible examples of embodiments can be found in the dependent claims.

The evaluation method can be executed at almost any time. Only the respective operating status must be unique. As a rule, an evaluation is carried out at intervals on the device. Furthermore, an evaluation with a withdrawn cash card in the device appears to be reasonable. In addition, it is advisable to perform an evaluation after the card has been ejected. The time of the evaluation can depend on the condition of the card reader device, in particular whether cards have been withdrawn and/or are within the device. It is also conceivable that permanent monitoring can be carried out without interruptions. The insertion of the card is detected by additional sensors. These measure the dimensions of the cash card in length, width and height. It is also possible to determine the material of the card. Discrete spectroscopy can be used to determine the material. It is conceivable that this determination could be taken over by the same additional sensors that measure the dimensions of the card. Optical sensors in the IR range can be used as sensors.

If a cash card is withdrawn, the card is ejected via an opening in the housing. This is monitored by a simple light barrier. Any covering of the light barrier is considered to be a manipulation. Only the signal from the card reader device to retract the card, the so-called retraction, authorizes the card to be covered.

In another possible embodiment, the mechatronic transducers are piezo-electric elements that act as actuators or sensors, whereby the evaluation device determines the function as actuator or sensor. It should be noted that an actuator can also act as a sensor, and that one of the two functionalities is implemented, depending on the control.

In a possible embodiment, at least three piezo-electric elements are arranged on the housing, of which one piezo-electric element is arranged on each side of the housing serving as a sensor respectively, and one piezo-electric element on the housing serving as an actuator. The two sensors are preferably arranged on two opposite side walls of the housing and the actuator is arranged on the top side at an angle of 90 degrees to it. Of course, other combinations and arrangements of sensors and actuators are also possible.

The positions of the piezo electrical elements can be determined by means of the housing eigenmodes. For this purpose, modular overlays are created which are then used to determine the positions.

In addition, it is conceivable that the operation of the card reader device or any other mechatronic unit of the device generates a signal input, which is then detected by the sensor-operated transducers. In this case, the actuators can be omitted.

Finally, the selected frequency or frequency range depends on the geometry and mass of the module. It is important to approach significant superpositions by means of the excitation or search signal, a so-called sweep. As a rule, the sweep reproduces different frequencies which can be approached in different ways with regard to the excitation curve. Sinusoidal excitation profiles or rectangular profiles can be mentioned as examples. Sinusoidal excitation profiles have proved to be advantageous, since the uniform periodic excitation has a more significant effect on the system of the housing. This makes the evaluation more unambiguous and stable.

The amplitude determines the height of the excitation pattern and thus the intensity of the excitation. It should be noted that the system is installed in an ATM and the volume is therefore of great importance. Since the frequency can be in the audible range, environmental damage must be taken into account. If the system is too noisy, it is not used as it disrupts the operation of the branch bank. On the other hand, it shouldn't be too quiet, because the evaluation needs a good signal for a good evaluation, which is optimal at a high amplitude. Thus, the amplitude can be adjusted according to the installation location and noise level.

The evaluation device is preferably designed to excite the actuator to perform a sweep from 100 Hz to 5 kHz, which starts at 100 Hz and ends at 5 kHz. In an alternative embodiment, significantly higher frequencies can also be used, e. g. 20 KHz or more depending on the power of the piezo element.

In another embodiment, the sweep can be divided into frequency ranges for analysis, whereby different methods of pattern recognition are applicable to each frequency range.

The excitation signal as an increasing sweep is preferably aperiodic

A possible range distribution can be:

| Range | Frequency range |
|---|---|
| 1 | 650-2140 Hz |
| 2 | 2190-2550 Hz |
| 3 | 2810-3470 Hz |
| 4 | 3470-4000 Hz |
| 5 | 4000-4300 Hz |
| 6 | 4400-4880 Hz |

These ranges depend on the design of the housing. There should be a correspondingly large number of eigenmodes within the ranges. Calibrations are therefore necessary for each type of housing in advance in order to determine a reasonable range. Other configurations are conceivable and depend on the housing.

The piezo-electric elements are attached to a housing or components of the card reading assembly as described above.

In a preferred embodiment, the evaluation device is designed to carry out a pattern recognition on the basis of the reference data.

In order to make this possible, a feature extraction is applied to the frequency ranges, in order to then apply classifiers to the extracted features, which recognize deviations on the basis of the reference data.

Stochastic means have proved to be advantageous for the feature extraction as they lead to many features. Another advantage is that the stochastic means can be used to summarize many data points.

Stochastic means preferably include arithmetic means, interquartile spacing, median, percentiles, quantiles, standard deviation, skew, variance, coefficient of variance and curvature, etc. These values can be used to easily identify a measurement and to extract these features efficiently, since not all values need to be loaded into the working/main memory. Further variance can be brought in by weighting the values. The deflections of the sensors are weighted with the corresponding frequencies. This weighting brings advantages when shifting the peak.

The evaluation device is designed to process the received signals with a feature extraction, whereby the extracted features are used for pattern recognition. The extracted features of one or more of the following include the above mentioned stochastic means. Further stochastic or statistic means are also conceivable. The skew is a statistical key number that describes the type and strength of asymmetry of a probability distribution. It shows whether and to what extent the distribution is inclined to the right (positive skewness) or to the left (negative skewness).

Kurtosis is a measure of the steepness or "peakedness" of a (single peak) probability function, statistical density function or frequency distribution. The curvature is the central moment of 4th order. Distributions with low curvature scatter relatively evenly; for distributions with high curvature, scattering results more from extreme but rare events.

The median or mean value is an average value for distributions in the statistics. The median of a collection of numeric values is the value that appears in the middle of the list when sorting the values by size.

The classifiers result from the formation of clusters and are preferably chosen at the end depending on the formation of the clusters.

The classifier can be used to assign a state to the signal. All classifiers need training data. The classifier can then use this data to construct its feature space. The better the training data, the better the feature space and the accuracy of the classifier.

The distance classifier determines the distance of a point to the existing classes. The distance measure between a point and a cluster can be determined with the Euclidean distance, the weighted Euclidean distance or the Mahalanobis distance. When looking at the Euclidean distance by vector, it should be noted that the values are normalized so that a good evaluation can be run.

With the Support-Vector Classifier, one can determine whether a value pair is to the left or right of a line by a vector view of the features.

A possible classification category is the fuzzy pattern classifier. The fuzzy pattern classifier is used in many systems. The basic idea is to determine the affiliation to a class by means of support points. This classifier represents only a probability of belonging to this class. Features are used as input variables for this class, these features could be stochastic values such as skew, curvature or standard deviation, but also the peaks determined by the FFT could be features. To these features values are then assigned using different functions. Envelopes curves represent popular functions within the classifier.

The calibration function should set the classifier so that it can return the correct state of the device. For this purpose, a pre-defined number of sweeps are performed at the beginning, this data is then analyzed for calibration and the features are extracted. Within calibration, the features are used to set the appropriate classifier. During the skimmer detection, the calibration should determine a trend line and then move it. Within the scope of the attachment recognition, the specific stochastic means for the distance classifier are determined from the features. At the end of calibration, the classifier is checked with the help of the images so that it always makes the right decision within the scope of the calibration data. The training data must be free of falsification. This means that the information must not be distorted by skimmer-like components, open flaps, attachments or other manipulations. Of course, this also applies to the operation site. Calibration at the moment of atypical lateral influences, such as the floor polishing in the foyer or on a construction site, should be ruled out.

In order to classify the clusters within a range in a target-oriented manner, it is necessary to identify meaningful classifiers that can be evaluated. The advantage of this invention is that a support vector and a distance classifier are used to solve the problem.

The support vector classifier is used to detect skimmers. It is described by two points in a two-dimensional feature space. Two classifiers of this type are used for reliable classification.

The distance classifier can be used to detect other changes. It is completely described by a point and radius.

DESCRIPTION OF THE FIGURES

In the following, the present invention is described in accordance with embodiments and the attached figures which show the following schematic representations.

DETAILED DESCRIPTION REFERENCING THE FIGURES

Figure 1A:
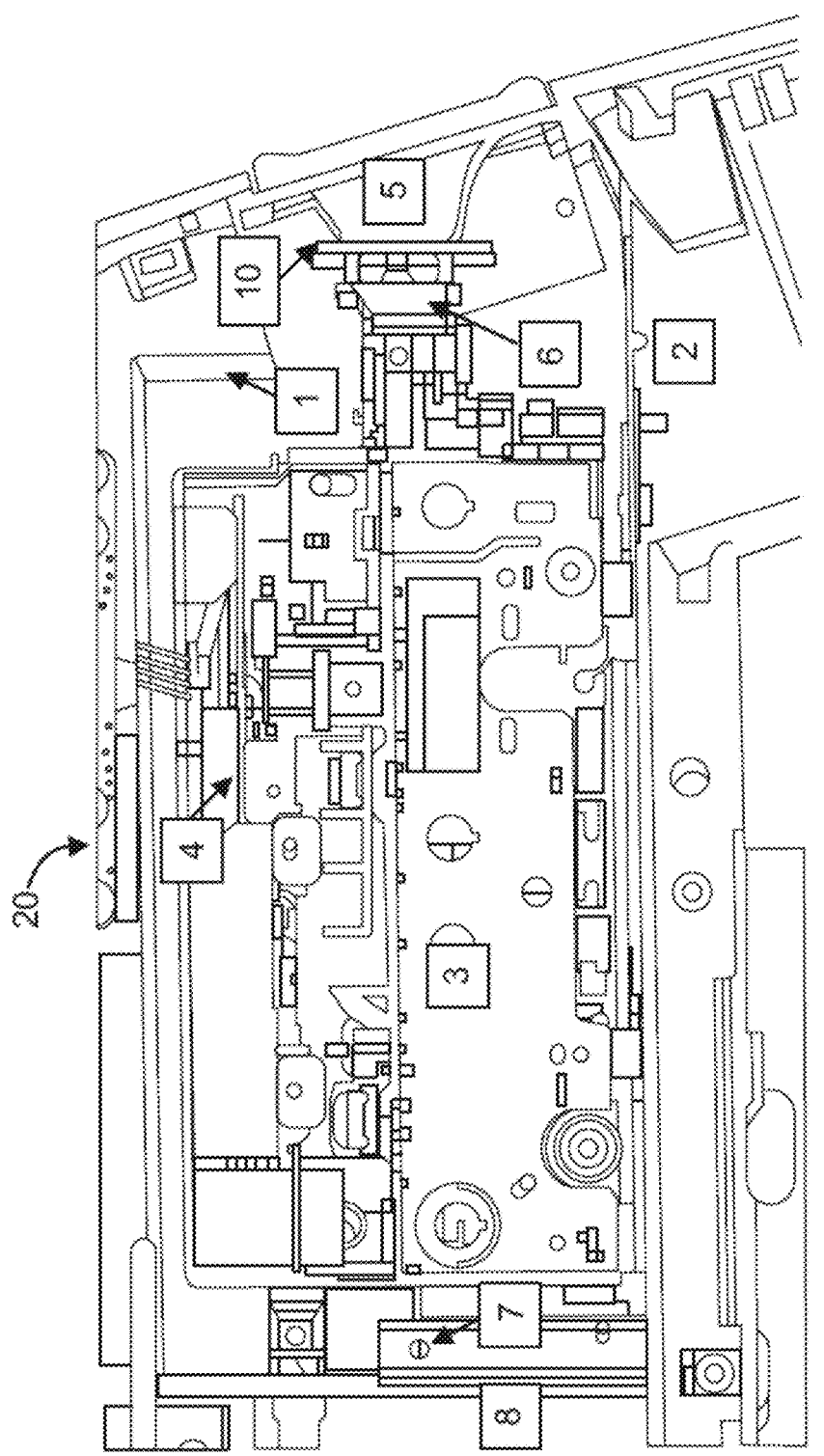
FIG. 1a shows a cross-sectional view of an installation of the card reading assembly.
Figure 1B:
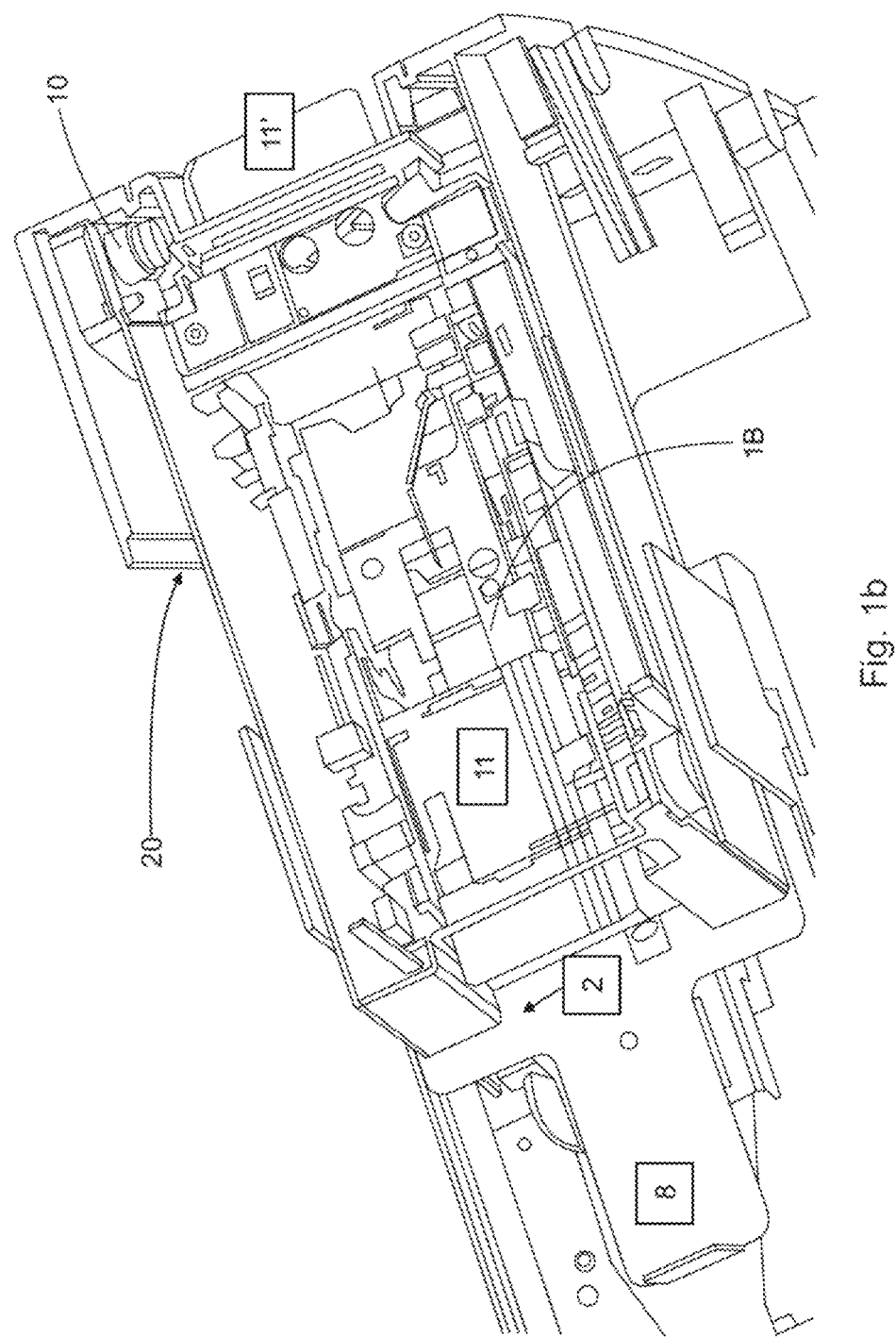
FIG. 1b shows a three dimensional view of the card reading assembly to be installed within a self-service terminal.

FIGS. 1a and 1b show a schematic view of the card reading assembly 20 comprising a storing compartment 13 for a card to be read. The storing compartment 13 also comprises the card reader device or card reading elements as such, that for instance comprise a contact area/pad for reading card chips and a reading head/pick-up to read magnetic strips. The card 11 or 11' to be read is supplied to the storing compartment 13 via the inserting slot by conventional means to be optimally positioned with respect to the card reading elements for reading. For this purpose conventional guiding and supply elements can be used.

In the present invention card reading assembly refers to device as a whole (cf. FIG. 1b) thus comprising the housing 1, a base plate 2, a card reader device 3, in some cases a so called IDKG-add-on 5, additional sensors 6, in particular light sensor(s) or sensor arrangement(s), and optionally a camera 10, and card-transportation means. Depending on the actual version it is also possible that the device comprises less components. The term card reader device refers to the device 3 that is used for the actual reading of the card. The housing 1 circumferences the card reader device 3 in connection with the base plate 2 completely. Preferably, the transducer elements 14a, b (mechatronic transducers) are mounted at/in the housing 1; but basically a mounting at all other single components is possible, too. For this purpose it is useful to consider a superposition of the modal stretching (functions of strain) in the frequency ranges to be considered. By doing so significant and therefore suitable positions can be visualized and a positioning can be done. The positioning of the transducer can be done after analysing the housing. In the present design, a piezo element 14*a* is arranged on top of the housing as actuator and two 14*b* on the sides as sensors.

The sole openings of the housing are represented by the opening area for insertion of the card (IDKG-slot unit/module 5) comprising the detection including the sensors 6 and by the opening for retraction of cards being monitored by the light barrier 7.

As is shown in particular in FIG. 1*b*, the card reading assembly 20 comprises a retraction compartment 8 in its rear area that is intended for storing/withholding cards 11 which the self-service terminal, due to have not met specific conditions, cannot give back to the user. The compartment 8, which is referred to as retraction compartment is located at the end of the supply/transport chain, meaning even behind the storing compartment 13 in which the specific card is read. After reading or attempting to read the card 11, said card is transported further to the retraction compartment 8.

Figure 2:
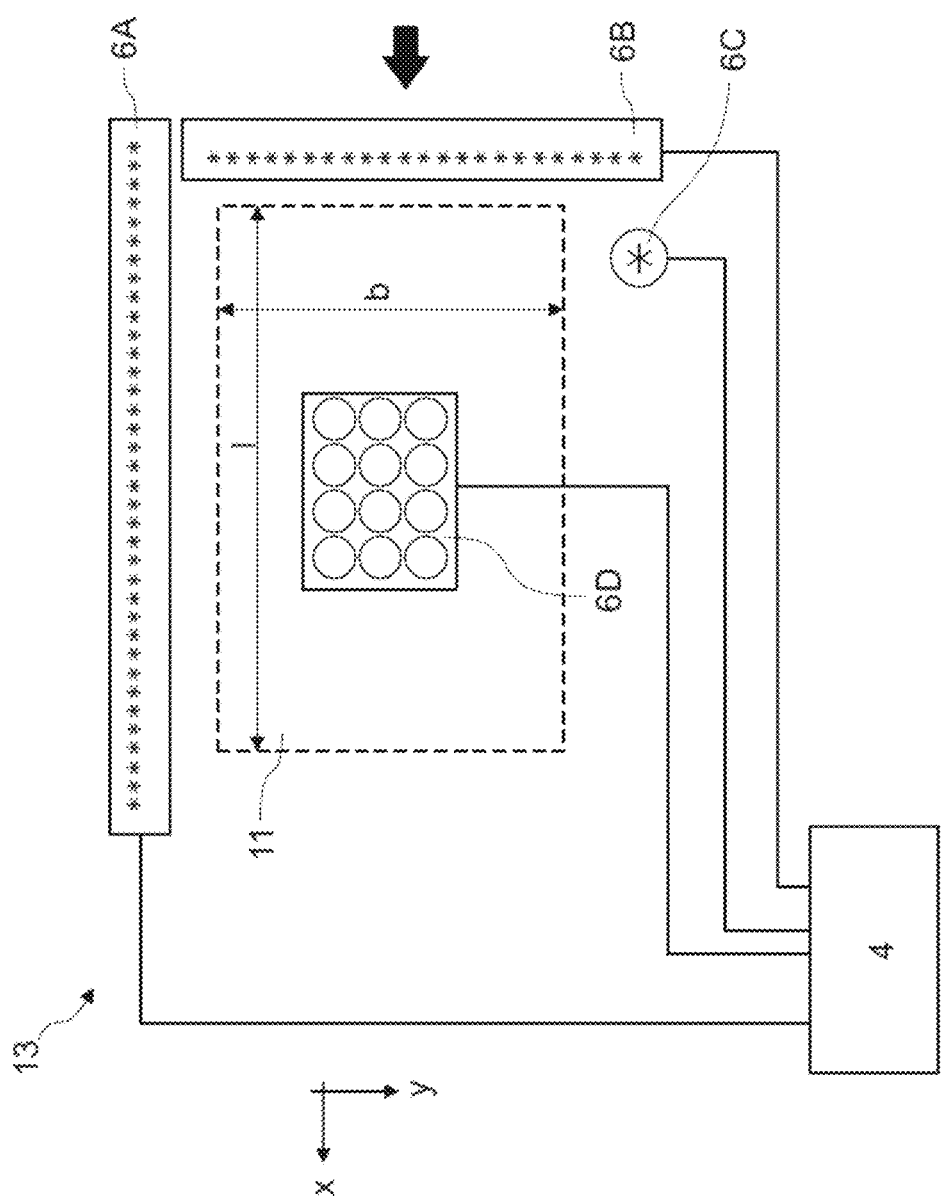
FIG. 2 shows a schematic view of an arrangement of sensor patches to verify the dimensions (length, width, height) of a card.

The card reading assembly 20 is equipped with a sensor system (of FIG. 2) that is mounted to a sensor carrier (of FIG. 1A) and can exactly detect and check the spatial dimensions (length, width and optionally height) of the inserted card 11. Optionally a material determination via discrete spectroscopy in the IR-range can be performed by means of the sensor system.

The sensor system is arranged such that at least one dimension can be captured/detected that is preferably the width b or the length l or optionally the height h of the card. The sensor system 6B measures the width b of the card but can also be used to measure the length l of the card, e.g. by a temporally triggered capturing by the sensor 6B, wherein the length of the card is determined via the intake velocity/intake time. Moreover, single sensors can be used for each dimension. Said sensors can particularly be sensor arrangements such as opto-electric sensor arrays or strips of the type TSL208R that are fabricated by the company TAOS and comprises 512 photodiodes linearly arranged in a distance of 125 μm. Herewith a very precise measurement can be achieved. Furthermore, an additional sensor 6C can be arranged within the card reader device or the storing compartment 13 to measure or check the height of the card (in z-direction). Depending on the specific housing it can be sufficient to measure only one or two dimensions that are preferably the length and/or the width.

By means of the integrated sensor systems 6A, 6B and/or 6C (optional) as well as by means of the light barrier 7 in combination with connection with the signal to retract coming from the card reader device 3 the slots of the housing can be secured. Additionally an installed camera 10 (of FIG. 1*b*) can be used. The functional connections are explained according to the FIGS. 4*a-c*.

Figure 3A:
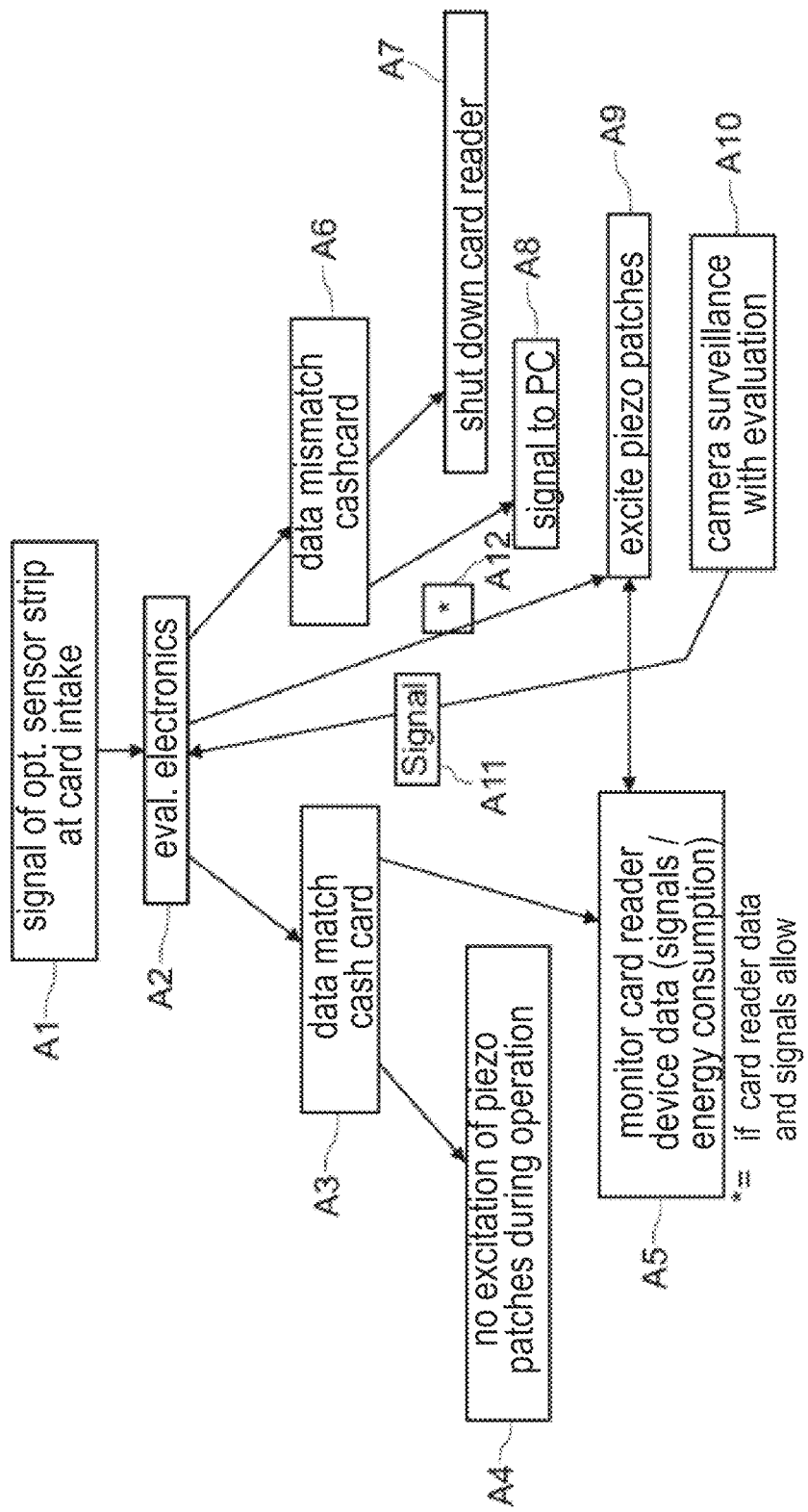
FIGS. 3a-c show logical connections between the steps of the method; a=inserting the card, b=retracting the card, c=checking/verifying the housing integrity.

First of all it is referred to the FIG. 3*a* that shows the verification of the inserted card 11, wherein said verification/check is executed with the opto-electric sensor arrangement. In FIG. 4*a* there are functional blocks A1-A12 that represent the following:

A1: The opto-electric sensor elements provide/generate measurement signals for a width b, a length l and optionally for the height of the card 11.

A2: The evaluation device/electronics 4 checks/verifies the measured data/values comparing said values with standardized values of normalized banking cards.

A3: If the measured values match/correlate to the standardized values the banking card is supposed to be a normal one.

A4: Exciting via the piezo-electric sensor arrangement field 6D is preferably not done during operation of the card reader device.

A5: However, monitoring of the card reader devices is executed, in particular of the card reader device signals and/or energy consumption of the card reader device.

A6: If the measured data, as determined in A2, do not correlate to the standardized values, this indicates that a manipulation attempt has occurred.

A7: Shutting down the card reader device, and retracting the manipulated card if possible.

A8: The software control of the self-service terminal, which can be a PC, provides a warning signal.

A9: An excitation can be executed at determined times of operation to verify the integrity of the housing.

A10: An optional camera surveillance (cf 10 in FIG. 1*a*) can generate signals (images, video and/or audio).

A11: The camera-signals are sent to the evaluation device 19 or to the computer in order to document the manipulation attempt and to store images of suspicious individuals for a subsequent identification.

A12: Optional step wherein it is indicated/signalled that block/step A9 is executed if this is allowed by the card reader device data/signals.

Figure 3B:
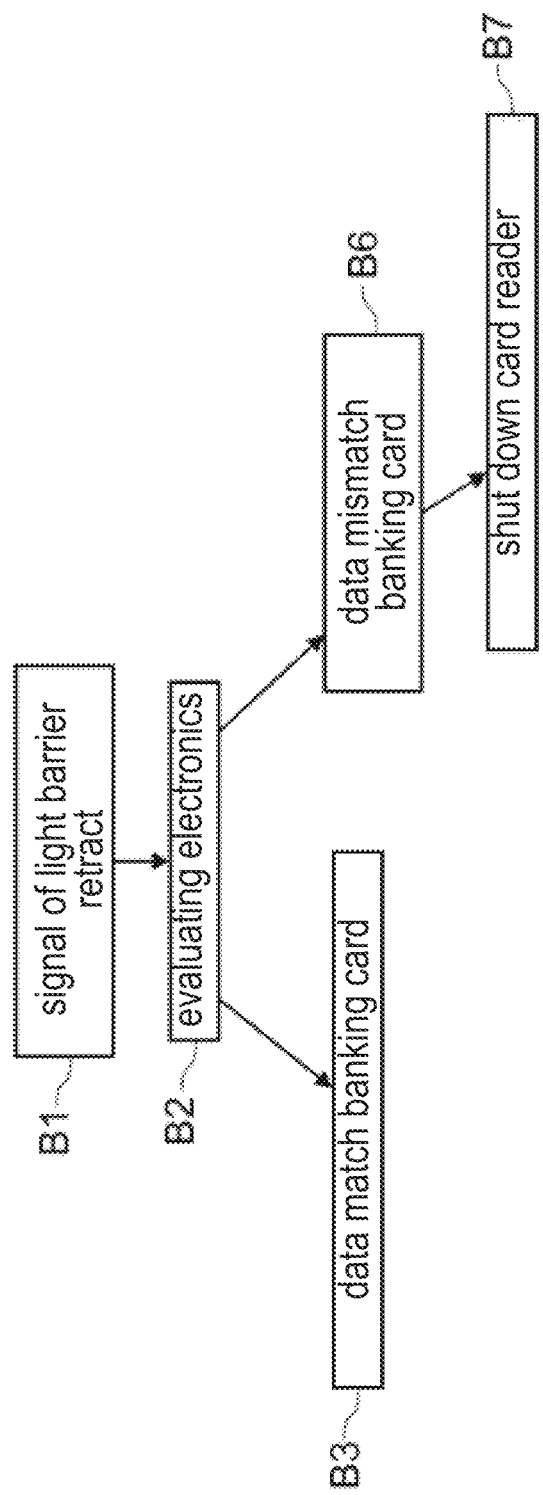

FIG. 3*b* is about monitoring the retract compartment via the sensor system or light barrier 7 (cf FIG. 1*a*) installed therein. In FIG. 3*b* there are functional blocks B1-B12 that display the following:

B1: The opto-electric sensor system or light barrier 7 at the retract slot creates signals, if a card 11, a fake card or another object is transported through this slot or if an alien object is attempted to be inserted through the compartment 8 from behind into the card reader device 3.

B2: The evaluation device compares the result to the status of the card reader device, meaning that the result is 'okay' if there is a retract situation. A11 other results are considered to be manipulation attempts.

B3: Depending on the signals and measuring values it is determined that a normal card has been transported/supplied trough the retract slot 7 or that a normal retract process has happened.

B6: If the transport of an abnormal card trough the retract slot 7 or the absence of a normal retract procedure has been determined in block/step B2, this indicates that there is a manipulation attempt.

B7: The card reader device is shut down/switched off.

Figure 3C:
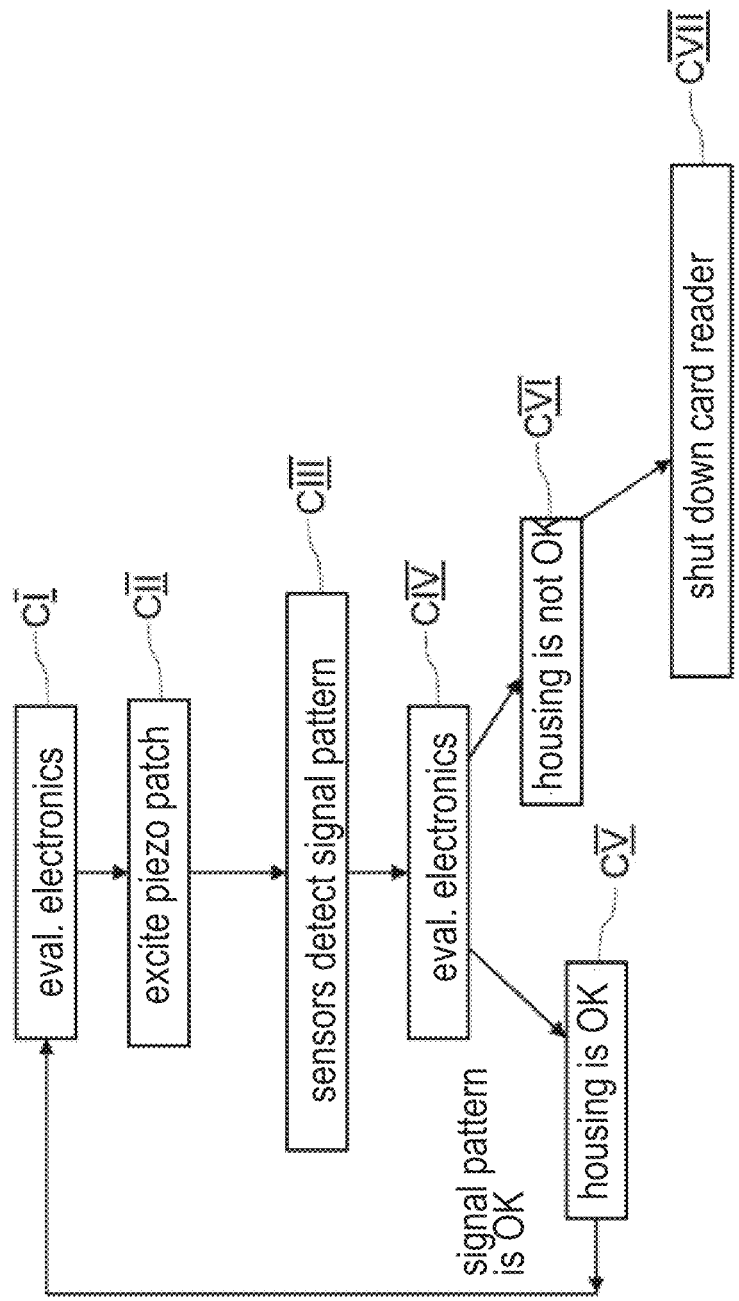

FIG. 3*c* refers to a verification of the integrity of the card reading unit. The functional principle shown in blocks/steps CI-CVII however refers to a material-check of the self-service terminal housing to determine if it has been manipulated. FIG. 4*c* refers to the verification of the housing (cf 1 in FIG. 1*b*):

CI: The evaluation device 4 triggers the verification/check of the housing by exciting piezo-electric actuators that are mounted at the housing to vibrate and by evaluating the measured values coming from same wise mounted sensor arrangements. The actuators can be integrated within the sensor arrangements (comparable to 6D in FIG. 1*b*) or can be single piezo-electric elements of a certain field/area that are controlled to vibrate.

CII: First of all the piezo-electric actuators are excited at known frequencies by a sweep.

CIII: The sensors capture the signal pattern.

CIV: The evaluation device evaluates via the described method.

CV: If the integrity of the housing is verified, the cycle starts from CI.

CVI: The integrity of the housing is not present, then the reader is switched off CVII: The card reader device is switched off; if necessary, even the entire self-service terminal In the following the verification of the card material via the piezo-electric or optical sensor arrangement 6D (cf FIG. 2) that is installed in the card reader device is described in detail. This solution can also be embodied/executed as an independent solution, but is described as a part of the disclosed method in the present description according to FIG. 2 and FIGS. 5-9:

To verify the integrity of the housing 1 of the card reading assembly, the card material and/or the storing compartment for the card 11, the measurement signals coming from the sensor arrangements 6D are pre-processed in the evaluation device 4.

Figure 4:
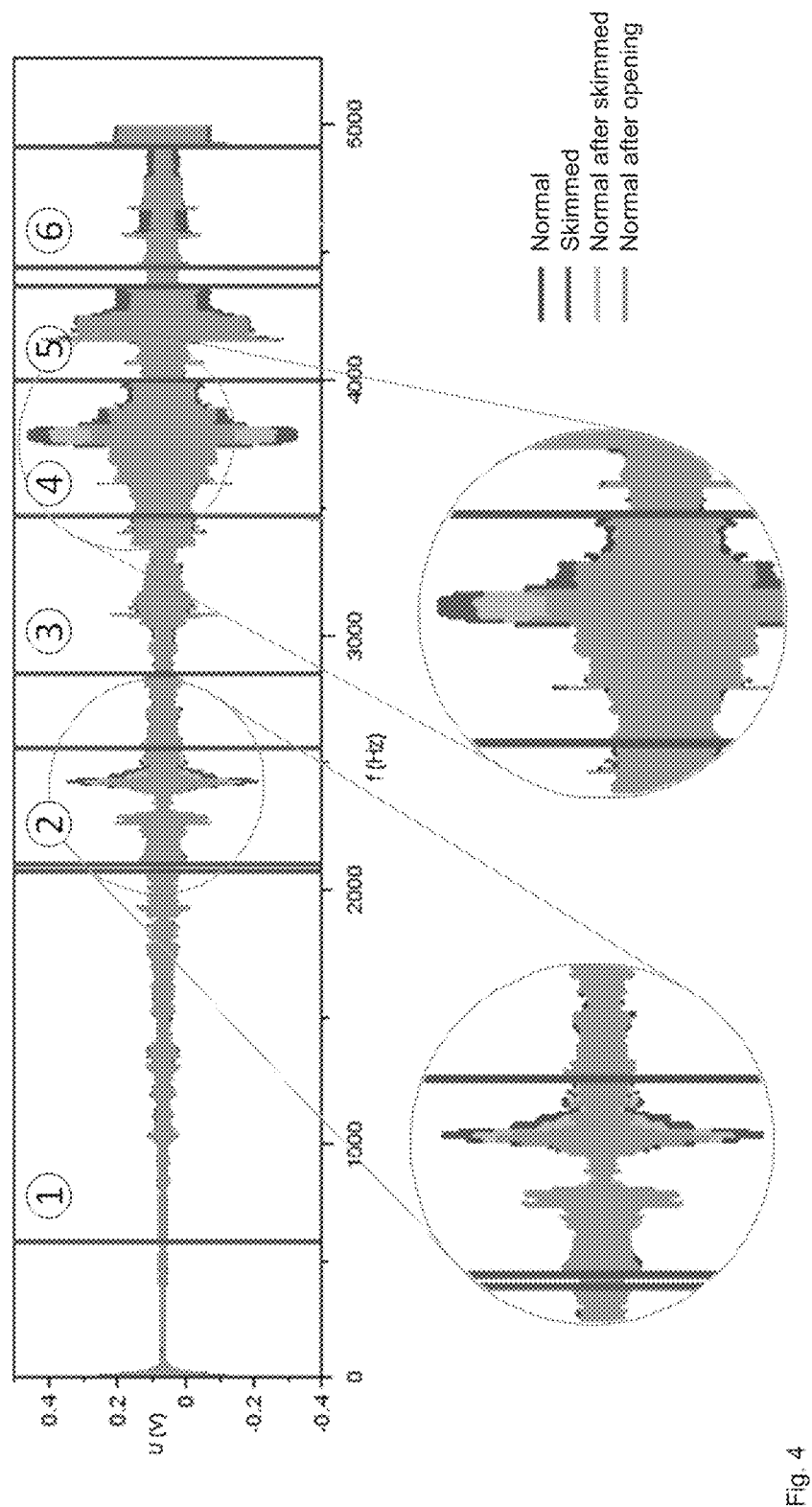
FIG. 4 shows a sweep divided into 6 frequency ranges, which are evaluated differently.

FIG. 4 shows a sweep from 100 Hz to 5 kHz, which is divided into 6 frequency ranges, which are evaluated differently; the frequency ranges have already been described above.

| Range | Frequency range |
| --- | --- |
| 1 | 650-2140 Hz |
| 2 | 2190-2550 Hz |
| 3 | 2810-3470 Hz |
| 4 | 3470-4000 Hz |
| 5 | 4000-4300 Hz |
| 6 | 4400-4880 Hz |

In the first range there are 45 eigenmodes of the housing, in the second range there are 11 eigenmodes. It becomes clear that the behaviour of the housing is not completely predictable and can be described by models. The system is too complex. This means that a separate calibration should be carried out for each installed system. The ranges are therefore broken down according to criteria such as eigenmodes in order to carry out different analysis in the ranges. The ranges are thus essentially determined by looking at the peaks of the signal. The blue range shows a normal course.

In FIG. 4, 4 different signals were superimposed on each other to illustrate the differences. The blue signal represents a proper condition. The red signal shows a trimmed state and the turquoise signal shows a state that is not currently manipulated, but after manipulation. The green signal indicates a proper condition, but the valve of the housing has been opened first. The detailed views clearly show that the states differ from each other. These signals can be used to determine the ranges. The ranges have been selected to include features such as peaks or obvious differences. Range 1 contains many eigenmodes of the system. The range 2 has a peak which could be used well, because the trimmed signal has a much higher amplitude. Range 3 contains a peak. The ranges 4 and 5 each contain a peak with significantly increased amplitude. However, it can also be seen that the amplitude levels show clear differences between the individual signals. Range 6 contains the last eigenmodes that can be recorded with the sweep.

Figure 5A:
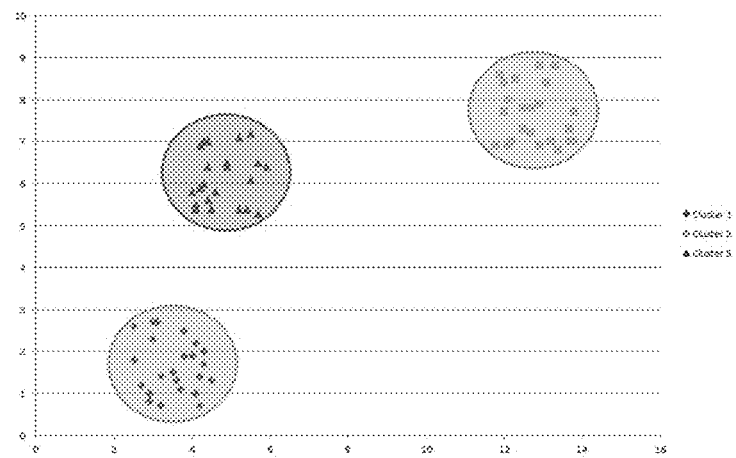
FIG. 5a, 5b show clusters and their separations.

FIG. 5a shows an exemplary cluster distribution and how these are summarized by a distance classifier.

Figure 5B:
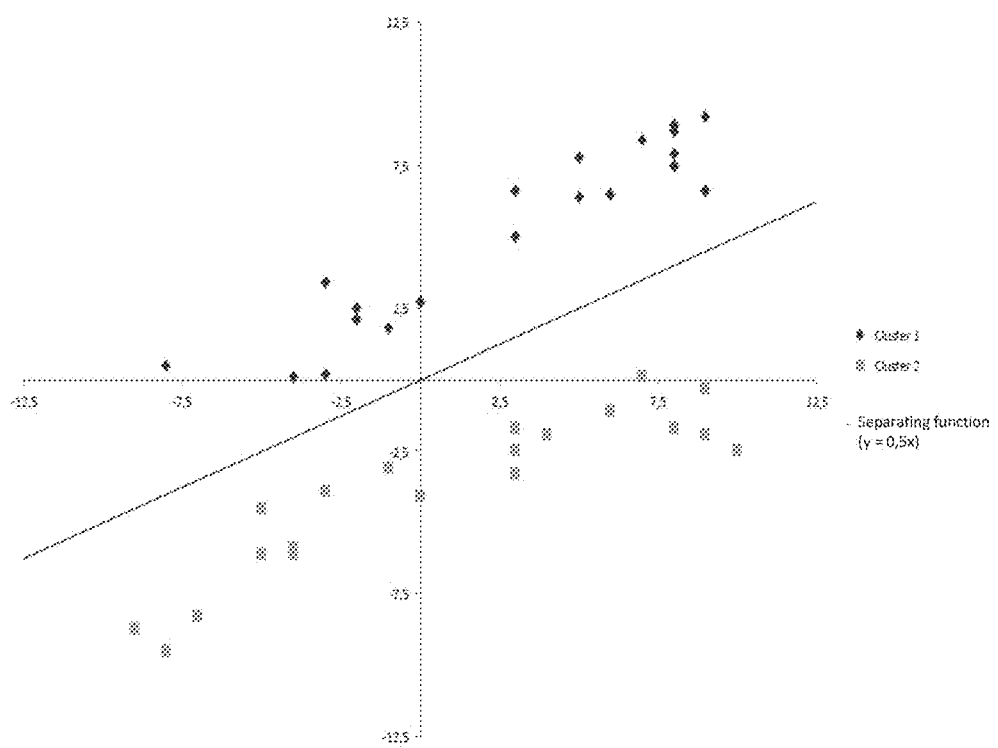

FIG. 5b shows an example of cluster separation using a straight line. Difficult for the separation with the help of a straight line is the fact that the method can be trained more elaborately, since the straight line has to be extracted from the training data. If one has the possibility to train the classifier with training data derived from both conditions, the straight line can be placed between the two clusters. However, if the training data only reflect one condition, it will be difficult to tell which condition is on the right or left of the straight line, since the position of the other condition cluster is unknown.

At feature extraction the presented stochastic means were considered.

Figure 6A:
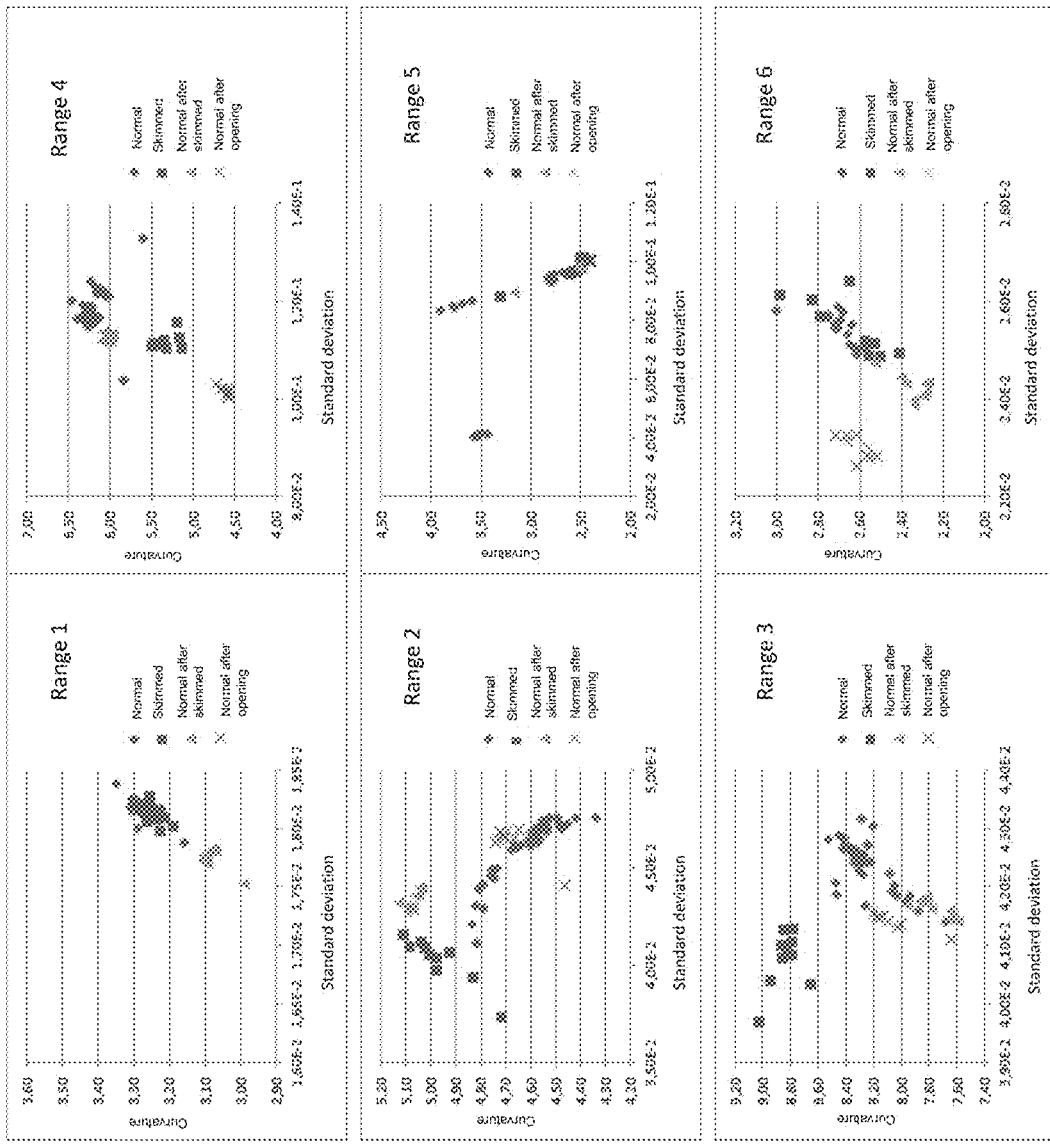
FIG. 6a-c show weighted feature spaces, from a sensor, a differential signal that is not manipulated and is manipulated, FIG. 7 Classificator representations in different ranges shown in FIG. 4.
Figure 6B:
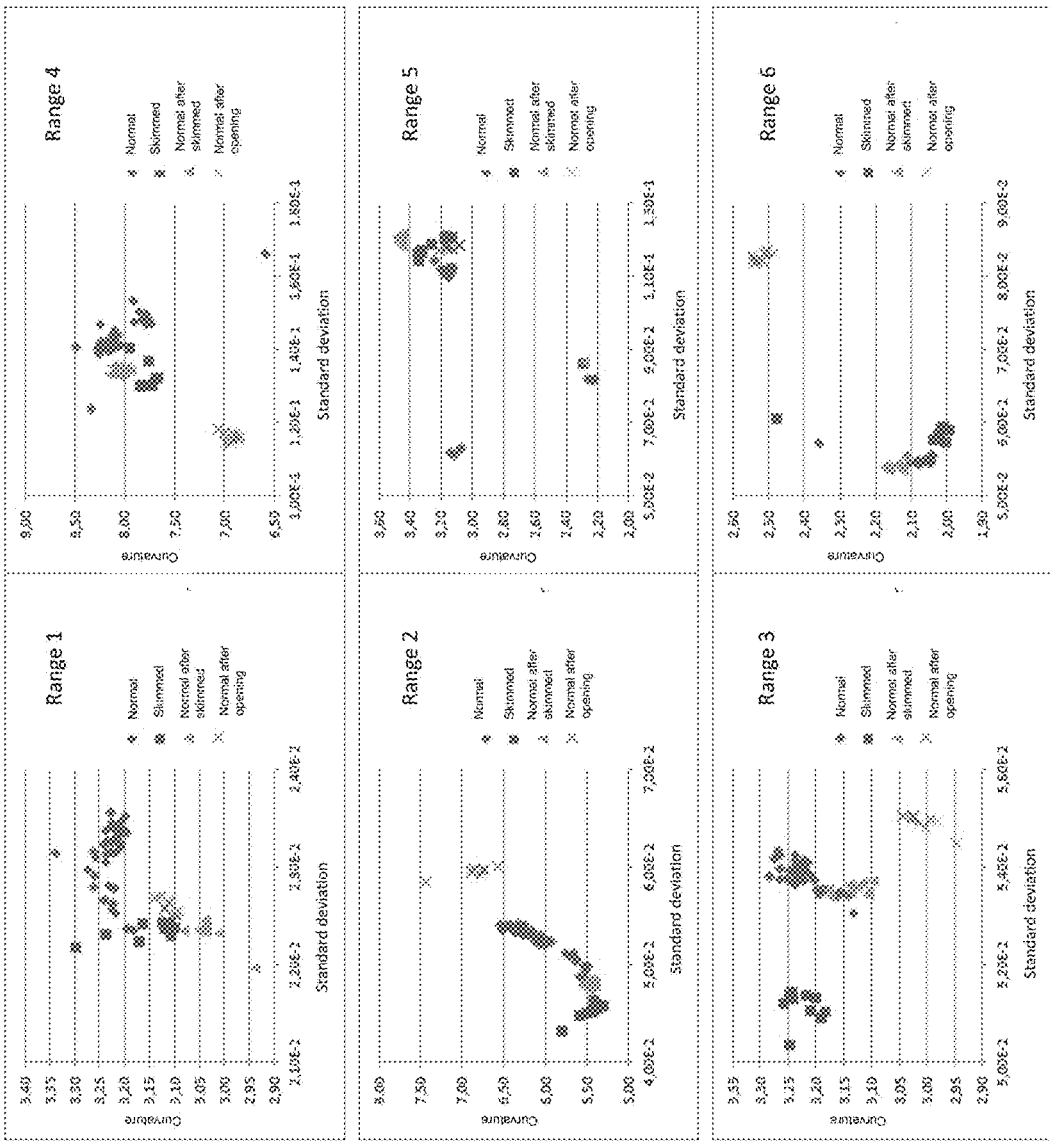
Figure 6C:
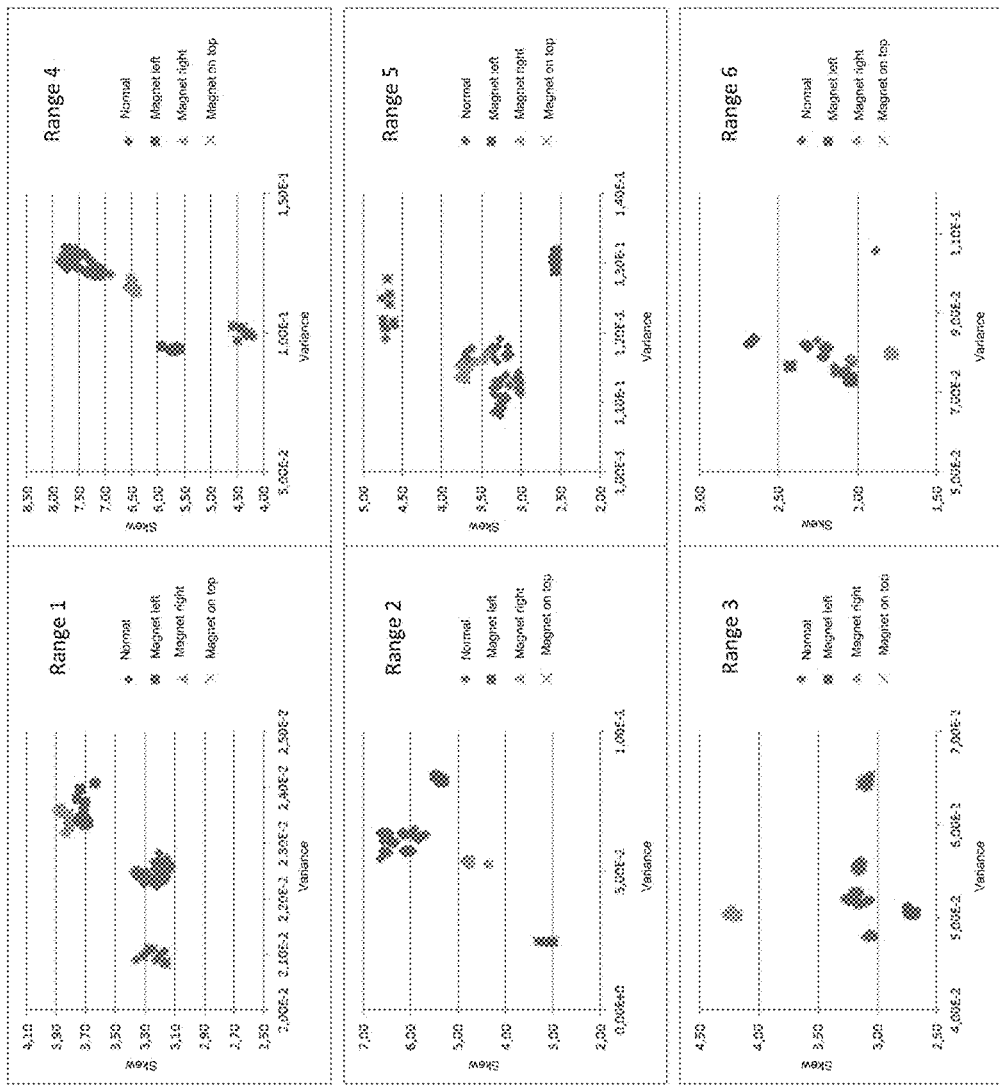
Figure 7A:
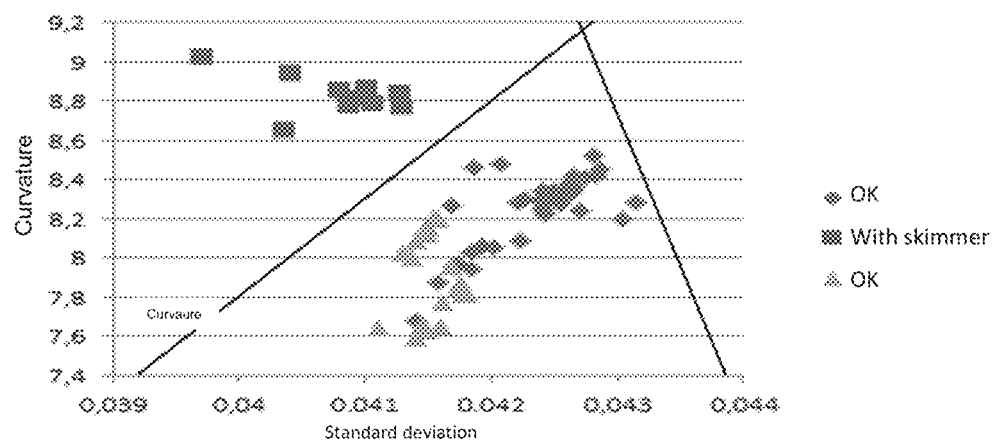
Figure 7B:
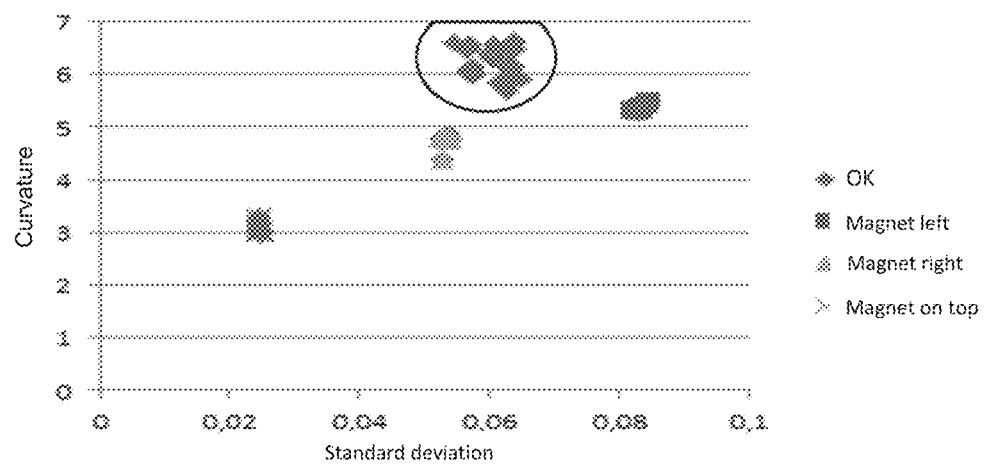

The FIGS. 6a-6c show the feature spaces that are used for the algorithm. These feature spaces show the individual variations that are possible by looking at the signals and extracting features. The 6 ranges are distinguished. It can be seen that clusters are formed in different ranges without signal processing. A weighting of the data points is almost unimportant, but can make sense in individual cases. A closer examination of the feature spaces reveals a slight positive effect in the individual clusters.

The sensor 14b, which is arranged on one side, forms in the range 2 and 3 reproducible clusters in case of a skimming manipulation. Range 3 of sensor 14b shows a better possibility for classification with the support vector classifier.

The difference signal (see FIG. 6a), which is obtained by a subtraction between the two sensors 14b, appears to be a suitable evaluation feature, since there is a larger difference between the cluster of the normal state and the cluster in the skimmed state (see FIG. 6b). However, this approach seems to be only partially suitable for classification, please refer to the application below.

Further sensor rows were used to check for other types of manipulation, such as bores, attachments or other changes to the housing. These series have shown that range 2 provides a good opportunity for analysis (see FIG. 6c). In contrast to the skimmer check, the differential signal is evaluated during the surface-mounting check, as otherwise changes on the opposite side of the sensor to be evaluated are not detected. The distance classifier is used for this evaluation.

The combination of different approaches makes this algorithm complex but also very flexible for all kinds of attacks. A calibration function should be used for each classifier. The challenge in calibrating the support vector classifier is to extract a trend line from the feature values, which is subsequently shifted by a fixed value to differentiate the states. The distance classifier is calibrated unambiguously by calculating the mean value and the standard deviation.

In order to classify the clusters within a range in a target-oriented manner, it is necessary to define meaningful classifiers that can be evaluated. In this method, a support vector and a distance classifier are used to solve the problem.

The support vector classifier is used to detect skimmers. It is described by two points in a two-dimensional feature space. Two classifiers of this type are used for reliable classification.

The distance classifier is used to detect other changes. It is completely described by a point and radius.

When storing the classifiers, care must be taken to ensure a small amount of data.

The extracted features include, for example, standard deviation; skew, Kurtosis, mean absolute deviation from the median; median of the absolute deviation. The standard deviation is a measure of the scattering of the values of a random variable around its expected value. The skew is a statistical key figure that describes the type and strength of asymmetry of a probability distribution. It shows whether and to what extent the distribution is inclined to the right (positive skewness) or to the left (negative skewness). Kurtosis is a measure of the steepness or "peakedness" of a (single peak) probability function, statistical density function or frequency distribution. The curvature is the central moment of 4th order. Distributions with low curvature scatter relatively evenly; for distributions with high curvature scattering results more from extreme but rare events.

The median or mean value is an average value for distributions in statistics. The median of a collection of numeric values is the value that appears in the middle of the list when sorting the values by size. The mean absolute deviation from the median is the scattering around the median. In descriptive statistics and stochastics, dispersion (also known as statistical spread or mean absolute deviation) refers to various measures that describe the range of values of a frequency distribution or probability distribution around a suitable position parameter. The different calculation methods differ in principle in their susceptibility or sensitivity to outliers. The spread of the frequency distribution is called standard error.

In addition to the installation of the opto-electrical sensor technology for testing the card dimensions (see sensor strips 6A and 6B as well as sensor 6C in FIG. 1a) and the piezo-electric sensor field 6D for testing the card material and/or the condition of the storing compartment, housing 1 of the self-service terminal (FIG. 1b) can also be equipped with piezo patches which monitor manipulations on the housing itself. The housing can be made of steel and/or plastic. Together with base plate 2 and IDKG insert 5, it forms a closed housing. The only openings are the card slots for card insertion and card retraction (area 8). The piezo patches are preferably glued on, but can also be injected directly into a plastic part. The sensors are operated by the evaluation electronics or evaluation device 4. The sensors can be operated both actuator and sensor. For this purpose, the evaluation device 4 actuates one of the sensors with a defined pattern and the remaining piezo patches acquire the excitation signal. The electronics adjusts the measured signal to the theoretical signal.

Furthermore, the PC of the self-service terminal (e. g. ATM) is connected to the electronics. The electronics energizes the card reader device and is also (optionally) logically connected to it. The former is used to switch the card reader device on and off, while the latter is used to process any firmware signals from the card reader device, such as a retraction or card feeder. If the signal output of the card reader device is not yet implemented in its firmware, the current consumption of the card reader device can alternatively be measured and thus draw conclusions about the operating mode (card feeder/retract/output/standby) of the reader.

The storing compartment (see FIG. 1b) guides and centres the card 11 to the card reader device 3, which is equipped with the said opto-electrical sensor technology, i.e. sensor and light barrier strip (s) that completely measures the geometric dimensions of the card. With the help of the at least one sensor strip, e. g. 6B in FIG. 2, it is possible to differentiate between a regular, valid card or an invalid object, e. g. a device for inserting a skimmer into the interior of the device. The signals from the sensor strip (s) 6A and/or 6B and the optional sensor 6C are evaluated by evaluation device 4. The same applies to light barrier 7 at the retraction output. Here, however, the assignment of the light barrier is not qualitatively evaluated, but an information fusion with the event or event "Retract of the card reader device" is created. In addition, the evaluation device can send 4 signals to the PC, which in turn activates the optional surveillance camera 10 via software (e. g. OSG) and checks the integrity of the card reader device slot.

LIST OF REFERENCE SYMBOLS 20 card reading assembly
1 housing
2 base plate
3 card reader device
4 evaluation electronics/evaluation device
5 IDKG insert
6 additive sensors on sensor carrier for card insertion monitoring
7 light barrier at the draw-in area (retract area)
8 storing compartment for retraction cards/withdrawn area (retract area) for cards to be retained
10 camera (s) (optional)
11 cash card (EC/Master/Visa) introduced
11 cash card (EC/Master/Visa) in the insertion slot
13 storing compartment for card (area of the card reader device)
6A, 6B 6B linearly extending sensor arrays, here sensor bars to check the length l or width b of the card
6C additional sensors to check the height of the card
6D sensor field with piezo electric sensor elements to check the material of the card
14a mechanical transducer/piezo element (actuator)
14b mechanical transducer/piezo element (sensor)

The invention claimed is:

1. A card reading assembly for a self-service terminal, comprising a housing into which a card is inserted to be read, comprising sensors and/or actuators connected to an evaluation device and comprising a plurality of piezo-electric transducers,
wherein the plurality of piezo-electric transducers are arranged in or on the housing such that the integrity of the card reading assembly, in particular the housing, is testable, the evaluation device configured to control a first of the plurality of piezo-electric transducers to excite at least a portion of the card reading assembly to vibrate, a second of the plurality of piezo-electric transducers configured to sense vibration and generate an output signal in response to the vibration of the at least a portion of the card reading assembly, the output signal corresponding to a sensed frequency of the vibration, the evaluation device also configured to receive the output signal from the second of the plurality of piezo-electric transducers, the evaluation device also configured to compare the received output signal with at least one predetermined frequency, and the evaluation device also configured to issue a warning signal in response to a deviation between the frequency represented by the output signal and the at least one predetermined frequency, the warning signal indicating a lack of integrity of the card reading assembly.

2. The card reading assembly according to claim 1, wherein a storing compartment is arranged in the housing in which the inserted card can be positioned in order to read out data stored on the card, the content of the storing compartment influencing the frequency represented by the output signal.

3. The card reading assembly according to claim 2, wherein the evaluation device manages reference data for different states of the card reading assembly, in particular whether a card is located in the storing compartment or whether there is no card in the storing compartment, wherein the reference data are managed by a classifier.

4. The card reading assembly according to claim 1, wherein the evaluation device is configured to receive the output signal in response to at least one event.

5. The card reading assembly according to claim 4, wherein the at least one event is one or more of the following: expiration of a period of time, detection by a sensor that a card has been inserted.

6. The card reading assembly according to claim 1, wherein the second of the plurality of piezo-electric transducers is operated at the natural frequency of the components and/or component groups or the housing.

7. The card reading assembly according to claim 1, wherein the plurality of piezo-electric transducers further comprise a third piezo-electric transducer, the third piezo-electric transducer positioned on a side of the housing serving as a sensor.

8. A card reading assembly for a self-service terminal, comprising a housing into which a card is retractable to be read, comprising sensors and/or actuators connected to an evaluation device and comprising a plurality of mechatronic transducers,
   wherein the mechatronic transducers are arranged in or on the housing such that the integrity of the card reading assembly, in particular the housing, is testable, the evaluation device being arranged to receive from the mechatronic transducers a signal which is excited by a part of the mechatronic transducers and is detected by a part of the mechatronic transducers in order to compare it with reference data, and to issue a warning signal in case of a defined deviation, indicating a lack of integrity of the card reading assembly, and wherein the evaluation device activates the mechatronic transducers to carry out a sweep from 100 Hz to 5 kHz, which starts at 100 Hz and ends at 5 kHz.

9. The card reading assembly according to claim 8, wherein the sweep for the analysis is divided into frequency ranges or is excited only in partial frequencies, whereby different methods for pattern recognition are applicable to each frequency range.

10. The card reading assembly according to claim 9, wherein a feature extraction is applicable to the frequency ranges, in order to then apply classifiers determining a condition to the extracted features.

11. A self-service terminal, in particular an automatic teller machine, with a card reading assembly according to claim 1.

* * * * *